Aug. 27, 1935.  H. WEVERS  2,012,366

NONSKID MECHANISM

Filed March 21, 1934

H. Wevers
INVENTOR

By Marks & Clerk
Attys.

Patented Aug. 27, 1935

2,012,366

UNITED STATES PATENT OFFICE 2,012,366

NONSKID MECHANISM

Hendrik Wevers, Hengelo, Netherlands

Application March 21, 1934, Serial No. 716,720
In the Netherlands March 14, 1933

5 Claims. (Cl. 188—181)

It is a well-known fact that a driven wheel and a braked wheel are more liable to skid than is a freely rolling wheel, so that any experienced automobilist or motorist, when driving on a slippery road, will avoid sudden speeding up of the motor and abrupt braking of the car.

This invention has for its object to provide reliable means for reducing the tendency of a motor vehicle to skid on a slippery road owing to sudden speeding up or abrupt braking. The essential feature of the invention is that an inertia mass is rotatably mounted on a shaft or other element coupled with the wheel or wheels and adapted, during relative rotation caused by acceleration or retardation of said shaft, to exert some action, for instance to axially move through a helical path, against the action of an inertia mass capable of movement in the longitudinal direction of the vehicle. In such a device, the relative sizes and weights of the constituting parts should be such that the forces produced by the inertia of said masses during the accelerations and retardations, i. e. the variations of the velocity of the car are in equilibrium as long as the ratio between the angular and the linear velocities and, as a consequence, also between the accelerations and retardations has a normal value, that is to say, as long as the circumferential speed of the wheel or wheels relative to the car body, is equal to the linear speed of the car, or, stated in other language, as long as the wheels perform a pure rolling movement. This equilibrium is disturbed whenever, owing to sudden speeding up of the motor, or to abrupt braking, the wheel begins to skid, i. e. when the angular retardation of the wheel exceeds the said normal value. The amount of energy liberated by this disturbance of the equilibrium is then utilized for reducing the driving torque, or the braking power, as the case may be, whereby the equilibrium is almost momentarily restored.

Figure 1:
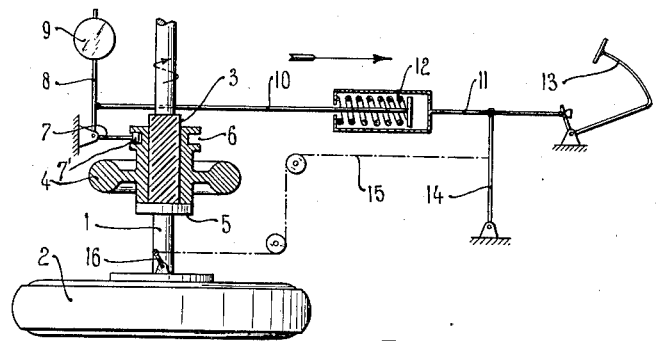
Figure 2:
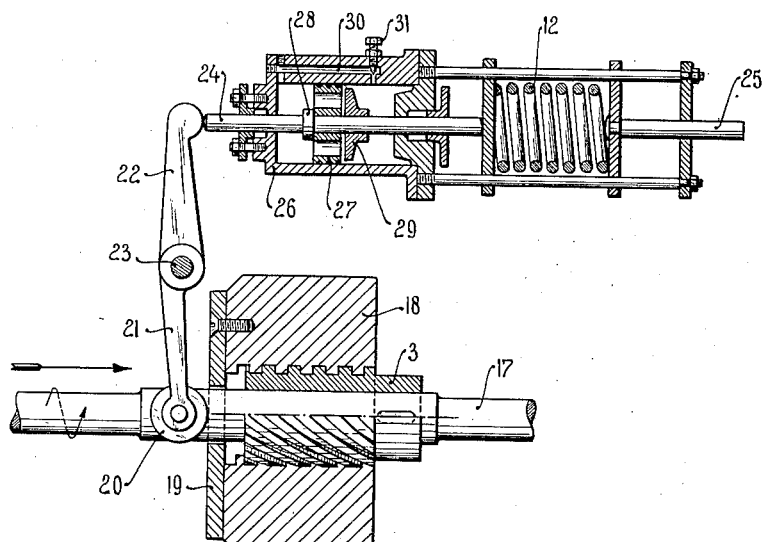
Figure 3:
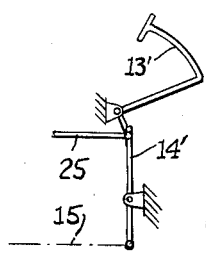

Fig. 1 of the annexed drawing is a diagram of my novel device, Fig. 2 being partly an elevation, partly a sectional view of a practical embodiment of the invention, and Fig. 3 is a diagram showing the connection of the rod 25 with the brake lever in the embodiment shown in Fig. 2.

Secured to the axle 1 of the wheel 2 is an externally screw-threaded bush 3 engaged by the internally threaded hub portion of an inertia body 4. In the position shown, one end of said hub portion engages a collar 5 on bush 3, the other end being provided with a circumferential groove 6 cooperating with a roller 7' pivoted to the arm 7 of a bell crank lever, the second arm 8 of which carries an inertia body 9. Hinged to arm 8 is a rod 10 in alignment with a rod 11, both rods being coupled through a coiled spring 12. Rod 11 is adapted to be moved lengthwise by the brake pedal 13 and is operatively coupled with the brake 16 by means of a lever 14 and a wire 15.

Assuming the motor vehicle fitted with the described device to start in the direction indicated by the arrow, both inertia bodies 4 and 9 have a tendency to remain in the position of rest. Body 4 will, therefore, tend to move axially towards the wheel 2, owing to its screw engagement with bush 3. Apart from collar 5, which positively prevents said axial movement, it is clear that the inertia body 9 will counteract this displacement, since it tends to lag behind the vehicle body, i. e. to move to the left relative to axle 1. The moment of inertia of body 4, the mass of body 9, as well as the pitch and the diameter of the screw thread of bush 3 have such values that the tendencies of bodies 4 and 9 to be displaced relative to the vehicle body are in equilibrium with one another as long as the wheel 2 performs a true rolling motion. If, however, the wheel 2 is so strongly braked and the road is so slippery that the wheel begins to skid— prior to coming to a standstill—then the inertia force of body 4 at once overrules that of body 9 so that the first said body moves away from the wheel.

This movement is transmitted through bell crank lever 7, 8 to rod 10, which is thereby pulled to the left so as to counteract, through spring 12, the force applied to the pedal 13, so that the brake is more or less released and the rolling motion of the wheel restored. This restoration implies that the retardation of the wheel is relatively smaller than that of the vehicle body, the result being that the various parts are reset in their original positions. By the increased counterpressure on the pedal 13 the driver is moreover warned against braking too strongly.

In the embodiment illustrated in Fig. 2, the inertia bodies 4 and 9 shown in Fig. 1 have been replaced by one single inertia body 18 in screw threaded engagement with a bush 3 keyed to a shaft 17 running in the longitudinal direction of the car and operatively coupled with a wheel. A steel wearing plate 19 secured to the left hand side face of body 18 is adapted to abut against bush 3 so as to limit the movement of said body to the right, and forms the race for two rollers 20 (one of which only is shown) mounted on the bifurcated arm 21 of a lever rotatable as at 23. The second arm 22 of said lever engages the end of a push rod 24 operatively coupled with the brake mechanism through a coiled spring 12 and a rod 25 similar to the showing in Figure 1. The rod 25 however is connected in somewhat different relation to the brake pedal 13' and lever 14' as is shown in Fig. 3.

Rod 24 extends through a cylinder 26 filled with a suitable liquid, the piston 27 of said cylinder being loosely mounted on said rod with a certain amount of clearance between a collar 28 and a valve disc 29 rigidly secured to the rod. Provided in the wall of cylinder 26 is a by-pass 30, the cross-sectional area of which can be adjusted by means of a screw 31.

Assuming the movement of the vehicle to the right being accelerated and the shaft 17 rotating in the direction indicated by the arrow, the body 18 tends to lag behind the vehicle body and also behind the shaft 17. Owing to the screw-threaded engagement of body 18 with bush 3, the first tendency would result in a movement to the left relative to the vehicle body, whereas the second tendency would result in a movement to the right.

The elements 3 and 18 are constructed in such a manner that when a normal ratio between the linear velocity of the vehicle and the angular velocity of shaft 17 exists (i. e. during the true rolling movement of the wheel) said tendencies compensate each other. If, now, the wheels when braked begin to skid as a result of the frictional condition of the tires and the road, body 18 is quickly screwed to the left, whereby rod 25 is pushed to the right and the brake is more or less released.

Movement of rod 24 to the right is not appreciably counteracted by the liquid in cylinder 26, since valve 29 is lifted from the mouths of passages provided in the piston, and the liquid is thus free to flow from the right to the left.

If, however, rod 24 is moved to the left, valve 29 closes the passages in piston 27, so that the liquid must flow through the by-pass 30, this flow being choked by the screw 31. This counteracts any tendency of the apparatus to rapidly alternate operative and inoperative position.

It is obvious that the angular inertia body, if so permitted by the linear inertia body, can perform its action in various manners. For instance, in a device as shown in Fig. 1, as distinguished from the construction illustrated in Fig. 2, the angular inertia body (4) need not itself be movable in axial direction, since its rotation relative to the axle could as well be utilized for imparting motion to another element, said motion being arranged to be counteracted by the action of the linear inertia body (9) when the wheel performs its normal rolling movement.

If my novel device is applied to a motor vehicle provided with a servo-brake, the inertia body or bodies may be very small.

I claim:

1. In a device for reducing the tendency of a motor vehicle provided with brake operating mechanism to skid owing to abrupt braking energy, a driving shaft, inertia means mounted on the vehicle, operative connections between said inertia means and said brake operating mechanism, operating connections between said inertia means and said driving shaft, the mounting of the inertia means and its connection with the driving shaft being such that the inertia of rotation and the inertia of bodily movement act in opposition to each other.

2. In a device for reducing the tendency of a motor vehicle provided with brake operating mechanism to skid owing to abrupt braking, the combination with a rotatable member coupled with a wheel, of means adapted to act on said brake mechanism for reducing excessive retardation of said member, an inertia mass rotatable relative to said member, and an inertia mass adapted for lengthwise motion relative to the vehicle in the normal direction of movement thereof in such a manner that the force exerted by the rotatable inertia mass during retardation of said member is counteracted by the force exerted by the lengthwise movable inertia mass, both forces being in equilibrium as long as the angular retardation of said member has a normal value relative to the linear retardation of the vehicle, but the force exerted by the rotatable inertia mass overruling so as to operate said means whenever the angular retardation exceeds said value.

3. A device in accordance with claim 2, characterized by this, that the rotatable inertia mass is adapted for axial movement along a helical path on a shaft coupled with the wheel and extending laterally with respect to the vehicle, said mass being operatively coupled through a bell crank lever or equivalent mechanism with the lengthwise movable inertia mass.

4. In a device for reducing the tendency of a motor vehicle provided with brake operating mechanism to skid owing to abrupt braking, the combination with a rotatable member coupled with a wheel, of means adapted to act on said brake mechanism for reducing excessive retardation of said member, an inertia mass adapted for axial movement along a helical path on a shaft coupled with the wheel and extending lengthwise of the vehicle in such a manner, that the force exerted by the inertia mass during angular retardation of said member is counteracted by the force exerted by the inertia mass during linear retardation, both forces being in equilibrium as long as the angular retardation of said member has a normal value relative to the linear retardation of the vehicle, but the first of the said forces overruling so as to operate said means whenever the angular retardation exceeds said value.

5. A device in accordance with claim 4, characterized by a hydraulic buffer provided intermediate the inertia mass and the brake mechanism of the vehicle, said buffer being adapted to retard the return motion of one of the elements of the transmission gear.

HENDRIK WEVERS.